No. 718,286. PATENTED JAN. 13, 1903.
R. H. SMITH.
MOLDING AND VULCANIZING APPARATUS.
APPLICATION FILED OCT. 3, 1902.
NO MODEL. 2 SHEETS—SHEET 1.
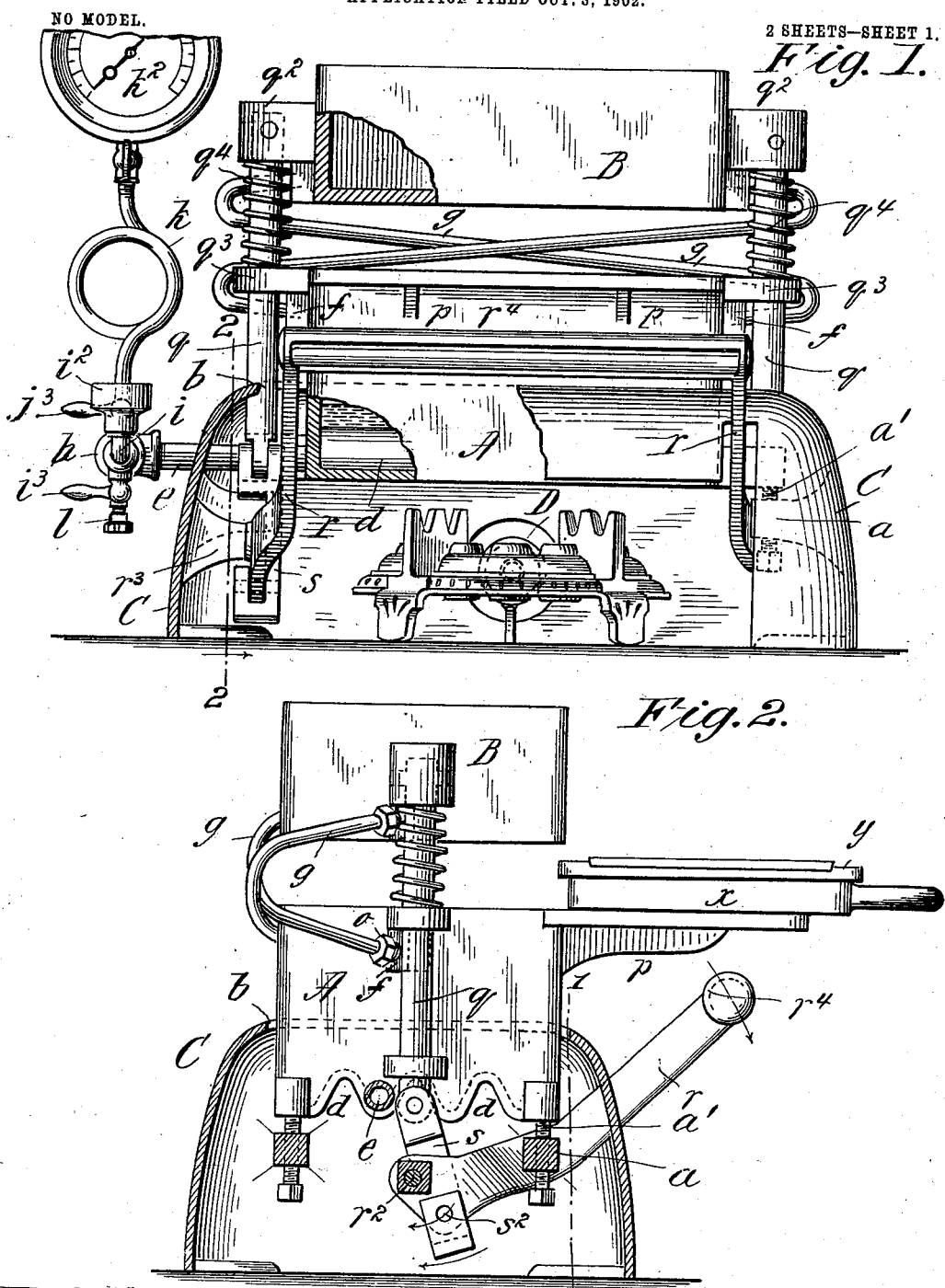

No. 718,286. PATENTED JAN. 13, 1903.
R. H. SMITH.
MOLDING AND VULCANIZING APPARATUS.
APPLICATION FILED OCT. 3, 1902.
NO MODEL. 2 SHEETS—SHEET 2.
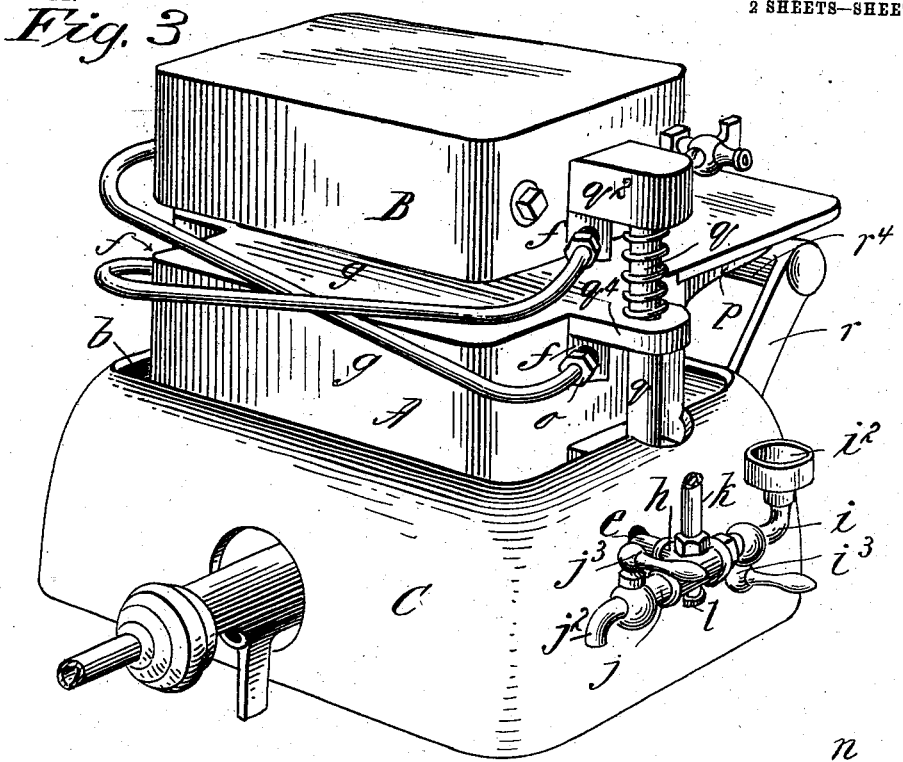
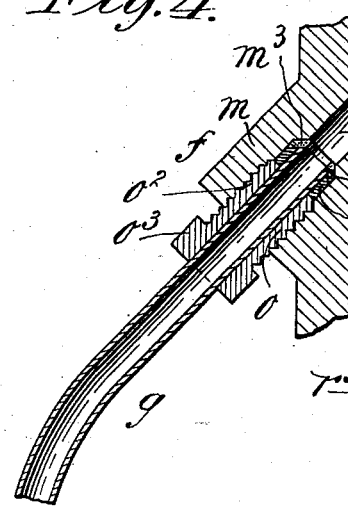
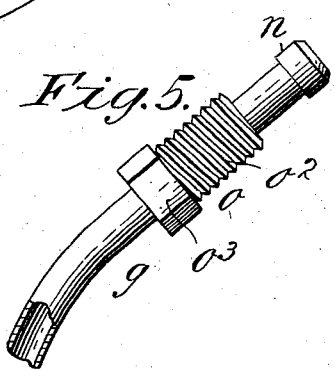
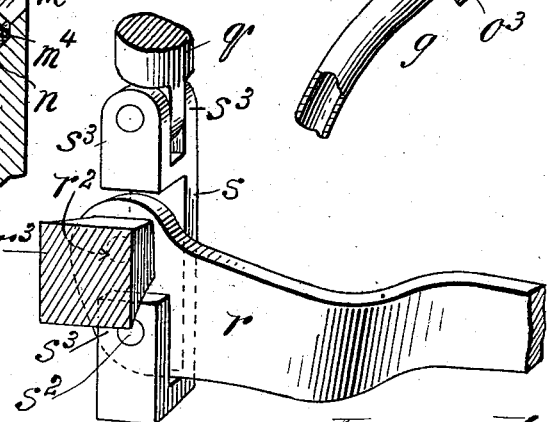
Witnesses:
J. D. Garfield
A. V. Leahy
Inventor:
R. H. Smith,
by Wm. J. Bellows,
Attorney.

UNITED STATES PATENT OFFICE.

RICHARD HALE SMITH, OF SPRINGFIELD, MASSACHUSETTS.

MOLDING AND VULCANIZING APPARATUS.

SPECIFICATION forming part of Letters Patent No. 718,286, dated January 13, 1903.

Application filed October 3, 1902. Serial No. 125,793. (No model.)

*To all whom it may concern:*

Be it known that I, RICHARD HALE SMITH, a citizen of the United States of America, and a resident of Springfield, in the county of Hampden and State of Massachusetts, have invented certain new and useful Improvements in Molding and Vulcanizing Apparatus, of which the following is a full, clear, and exact description.

This invention relates to an improved apparatus for vulcanizing small articles generally, but is more especially designed for molding and vulcanizing sheets of rubber type and stereotype, and belongs to that well-known class of vulcanizing apparatus wherein the heat is communicated by steam which does not come into direct contact with the molds, but is confined within two closed steam-tight chests or chambers, by and between the outer surfaces of which the rubber is softened by the heat, forced into the matrix until a desired thickness is obtained, and securely confined between the chests until it has been subjected to the proper degree of heat for the required length of time.

One object of the invention is carried out in the construction and mounting of both steam-chests by which great compactness is obtained, as well as the utmost freedom from superfluous iron, which might be so connected as to draw off the heat unevenly, (thereby producing inaccurate results,) whereby a great saving of time and fuel is assured in the performance of a given amount of work, whereby there is also acquired a more uniform temperature of the upper compressing-surface, this latter constituting a most important result, as this surface comes in direct contact with the rubber or other material to be vulcanized, while the under surface or bed comes in contact with the matrix-plate which has between it and the rubber the mold or matrix, which is usually composed of concrete material—a poor conductor of heat.

Another object of the invention is carried out by the means provided for compressing the rubber between the surfaces of the upper and lower steam-box as insuring an exactly duplicated thickness of any number of sheets from the same mold, with convenient means for adjusting the apparatus to adapt it to any desired thickness, of course within reasonable limits; and another object of the invention is carried out in the means for making the connections for the circulation of steam between the upper and lower steam chests or boxes, obviating the necessity for use of the dangerous and unsatisfactory rubber-hose connections or the expensive, troublesome, and leaky combination of pipes and swivel-joints at present commonly used in vulcanizing apparatuses of this general class and obviating such lengthy and air-exposed connections as would constitute material cooling-surfaces; and the invention consists in the combination or arrangement of the parts and the construction of certain of the parts, all substantially as hereinafter rendered apparent in the following description of the apparatus, made in connection with the drawings thereof, and as set forth in the claims.

In the drawings, Figure 1 is a front elevation of the improved vulcanizing apparatus with parts thereof shown in vertical section for increased clearness of illustration. Fig. 2 is an end elevation of the same as seen next inside of the end portion of the casing, which latter is shown in section as taken on the line 2 2, Fig. 1. Fig. 3 is a perspective view of the vulcanizing apparatus as seen from the rear side thereof. Fig. 4 is a sectional view showing a detail of construction involved in the novel connection by pipe between the upper and lower steam-boxes. Fig. 5 is a side view of a portion of the pipe connection which in the preceding figure is shown in section. Fig. 6 is a perspective view, on a larger scale, of a portion of the mechanism provided for imparting forcibly the approaching and retreating motions of the upper steam-box toward and away from the lower steam-box of the vulcanizing apparatus.

Similar characters of reference indicate corresponding parts in all of the views.

In the drawings, A represents the lower rectangular steam-box, which constitutes the bed, and B represents the upper rectangular steam-box, which is mounted for a bodily vertical movement toward and away from the lower box, such movement being imparted by means here shown and hereinafter pointed out.

The lower steam-box A is mounted for a vertical adjustment upon lugs $a\ a$ of a base casing or casting C, which at its bottom covers a rectangular area somewhat greater than that of the lower steam-box, and rising from its bottom it has a contour approximately like a turtle-back and has a rectangular opening $b$ at its top, the margins of which are drawn comparatively closely in toward the sides of the lower box, although separated therefrom, so as to leave a completely-surrounding passage, whereby the heated air from the heater (a gas-heater being here shown, indicated at D) may be permitted to pass upwardly and in so passing be guided or retained in contact on and in proximity to the sides of the lower steam-box, whereby the heat is most economically utilized.

Through the aforementioned supporting-lugs $a\ a$ (suitably separated portions of which are integrally cast as a part of and extend horizontally inwardly beyond the inner surfaces of the end walls of the aforementioned turtle-back casing) threaded screw-studs $a'$ engage, the upwardly-protruding ends of which constitute the adjustable supports, on which rests, adjacent its four corners, the lower steam-box. Said lower box is when adjusted, and to all intents and purposes while in use, the same as if it were an immovable part of the base-casing C.

The lower steam-box has its bottom formed quite deeply corrugated, as shown at $d$, whereby increased external heating-surface, to receive the impingement of the gas-heater frame, is acquired, and whereby internal water-legs are also produced.

The lower steam-box is completely closed, except in respect of the water-inlet pipe $e$, which enters, as shown in Figs. 1 and 2, at the bottom of one of the water-legs, and the opposite end connections at $f\ f$, whereat the communication for steam-conduit is made between the lower steam-box and the upper steam-box through the medium of the metallic (preferably brass) pipes $g\ g$, which are of bowed or approximately bail form. The inlet-pipe $e$ has at its projecting portion, outside of the base-casing C, the coupling $h$, with one limb of which the L-shaped filling-pipe $i$ is connected, said pipe having at its upper end the upwardly-open cup or receptacle $i^2$, the top of which is at the height of the desired water-level to be generally maintained in the lower steam-box, and to another limb of said coupling a short pipe $j$ has connection, the same having a turned-down nozzle $j^2$, and in both the said pipes $i$ and $j$, respectively between the filling-receptacle and the coupling and between the nozzle $j^2$ and the coupling $h$, are the shut-off cocks $i^3$ and $j^3$, and to the top portion of the said coupling $h$ the upstanding pipe $k$ is connected, at the upper end of which is connected a steam-gage $k^2$. With the cock $j^3$ closed and the cock $i^3$ left open, the lower steam-box may be filled with water up to the desired level, whereupon the cock $i^3$ is closed.

As occasion may require, between the times of using the apparatus, the cock $j^3$ may be opened and the dead water therein, with accumulations of foreign material, may be withdrawn through the nozzle $j^2$.

Connected to and depending below the coupling $h$ is a safety or blow-off plug $l$, the same being understood as constructed or adjusted for automatic relief when an excessive or undue maximum of steam-pressure within the pipe-connected steam-boxes A and B is reached.

Connections of the two brass pipes $g$ are made with the opposite ends of the upper portions of the lower steam-box A, and each of these pipes $g$, which is of the bowed or bail form, as clearly shown in the drawings, extends with an upward inclination to connection with the lower portion of the relatively opposite end of the upper steam-box B, each pipe $g$ having approximately quarter-circular bends adjacent the two rear corners of the steam-boxes in order to have their proper courses from the point of connection with the one end of the lower box to the opposite end of the upper box. The course of each pipe, while being a detour, is in as close adherence to the end and back walls of the steam-box as is practically possible in order to permit, by the flexure of the bowed pipe, the necessary although comparatively slight degree of rising-and-falling movement of the one steam-box relatively to the other, all within the scope or possibility of flexure of the pipe and without the necessity of any form of universal joint or swiveling connection at any place in the pipe or in its attachment to the steam-boxes.

The rigid and steam-tight box and pipe connection made in accordance with the capabilites last referred to (indicated at $f\ f$ in the drawings) is shown in detail in Fig. 4.

Each of the steam-boxes A and B has at its end the integral lug or boss $m$, in which a passage $m^2$ is formed diagonally. Well within the mouth or outer end of this passage is an annular and preferably beveled seat $m^3$ for the reception thereon of a lead or other annular packing-section $m^4$. An intermediate portion of the passage outwardly beyond the beveled seat is of cylindrical form, while outwardly therefrom to the end of the passage the passage is screw-tapped.

The pipe $g$ has at its inner end the externally cylindrical enlargement $n$, the forward end of which is preferably beveled and which enlargement may freely pass into the aforementioned passage beyond the screw-threads thereof to fit in the cylindrical intermediate portion of the passage and to have its beveled inner end in crowding bearing against the lead packing-washer to force it to conform to and assume the shape of the beveled seat and the beveled end of the pipe enlargement, as shown in Fig. 4. The washer may when inserted be flat; but it readily conforms to the shape shown in Fig. 4 when forced between the seat and the pipe end. The annular or tubular nut $o$, having the screw-threaded portion $o^2$ and the polygonal head $o^3$, loosely encircling at a point back from the enlargement $n$ by its screw-threaded portion entering into the threaded orifice of the passage and by its inner end engaging the enlargement $n$, forces the end of the pipe, formed as described, closely to its seat and makes a rigid anchorage or connection of the pipe with the end of the box and the efficient steam-tight joint.

For practicability of construction and assemblage the portion making the enlargement $n$ is constituted by a short section or sleeve, which is brazed upon the end of the pipe $g$, the annular end having been previously slipped upon the pipe to a position back of the part which receives the enlarging sleeve.

The lower and normally immovable steam-box is constructed with the bracket-lugs $p\ p$, on which a shelf in extension of the top and the upper surface of which is level with the top of the steam-box, is supported, and generally in the use of this vulcanizing-press a plate $x$, Fig. 2, of good conducting metal, is employed, on which the mold and matrix $y$ are superimposed, the employment of the aforementioned plate $x$ rendering but a slight closing movement of the upper steam-box downwardly toward the lower box necessary, and hence it is practicable to employ in the apparatus link-and-lever devices for imparting the forcible closing movements to the upper box, which because of the short extent of motion necessary is susceptible of immense power, and the means for guiding and imparting the movements to the upper box, as shown, consists of the depending bars or posts $q\ q$, secured to the lugs $q^2\ q^2$, projecting from the opposite ends of the upper box, the lever-frame $r$, the inner lower ends of the side members of which are pivotally mounted at $r^2$ to the lugs $r^3$, which are integrally formed as a part and extend inwardly from the middle of the base-casing end walls, and the links $s$, which are jointed to the lower ends of the depending bars $q$ and to the lever members $r\ r$ at the joints $s^2$, which are comparatively close to the fulcrums $r^2$ of said members $r$, and thus the powerful leverage may be exerted at the handle portion $r^4$, extending between and uniting the lever members $r\ r$, so that many tons pressure may be actually exerted in the downward direction by the upper steam-box against the mold, which is between it and the lower box.

In order to insure compactness in the relations of the parts and to have no unnecessary space between the ends of the base-casing C and the ends of the lower steam-box, the link $s$ is formed, as shown in Fig. 6, with the double ear-lugs $s^3\ s^3$ at its upper and lower portions, one each of the upper and lower lugs being offset from the plane of the link, the space between the upper and lower ear-lugs giving clearance for the lug as it swings, so as not to interfere with or be interfered with by the journal-lugs $r^3$.

Spiral springs $q^4$, between the guide-lugs $q^3$ of the lower box and the lugs $q^2$ of the upper box, raise or assist in raising the upper box when the lever is swung to separate the boxes.

The metallic (preferably brass) pipes $g$, formed, arranged, and connected in relation to the upper and lower steam-boxes, substantially as described, permit the reception of the steam supplied from the lower to the upper box, permit the use of the press and vulcanizer for a protracted time without the metal from which the pipes are composed becoming hardened or frangible, and such arrangement permits with equal facility any desired vertical adjustment of the lower box, and such pipe connections, while possessing the qualities of strength and durability in a degree largely increased over steam-hose, insures also an avoidance either of swivel or universal joint connections heretofore regarded necessary where metallic pipes were used to connect the two steam-boxes or the avoidance of long "trombone" pipe extensions provided at the back of the vulcanizer and extending at a great distance in both directions beyond the ends thereof. And this vulcanizing-press is, due to the manner of its organization, found to be capable of performing in vulcanization, while imparting to the work being vulcanized all adequate compression, more work in a given time than any other vulcanizing-press known to me, even although same is materially larger in respect of all portions thereof.

What I claim is—

1. In a vulcanizing apparatus of the character described, two steam-boxes one of which is movable toward and from the other, and means for imparting the movements of one of the boxes thereto, a jointless metallic pipe having a rigid steam connection with the interior of one of said boxes and extending therefrom to a rigid connection with the other steam-box, and being susceptible of permitting, by the flexure of the jointless metallic pipe, the required approaching and separating movements of the one box relatively to the other.

2. In a vulcanizing apparatus, in combination, upper and lower steam-boxes one of which is movable toward and from the other, and means for imparting the movements thereto, and a metallic pipe having a steam connection at one end of the lower box near its top, and extending therefrom to the rear in a curved course, thence ranging along the length of the box and having a forwardly-curved course and a connection with the lower portion of the opposite end of the upper box, said pipe having from its connection with the lower to its connection with the upper box an upward inclination.

3. In a vulcanizing apparatus, in combination, upper and lower steam-boxes one of which is movable toward and from the other, and means for imparting the movements thereto, and duplicated metallic pipes, each having a rigid steam connection at or near one end of the lower box adjacent its top ranging along the length of the box near its rear, and having connection with a lower portion of the upper box, adjacent the opposite end portion thereof, such said pipe having, adjacent its points of connection with said boxes, curved portions, for the purpose set forth.

4. In a vulcanizing apparatus of the character described, the upper and lower steam-boxes, one being movable relatively to the other, and means for imparting the movement of the one box toward and from the other, both boxes having steam-passages through their walls, each said passage having an intermediate annular seat and its wall outwardly therebeyond internally screw-threaded, an upwardly-curving pipe extending from said passage in the lower to said passage in the upper box having at each extremity an enlargement, and an annular nut rotatably fitted on each pipe extremity back of the said enlargement, and operative by screw engagement in the threaded portion of said passage and by contact against said enlargement to force and retain the end of the pipe in adherence to its seat.

5. In a vulcanizing apparatus of the character described, the upper and lower steam-boxes the one being movable relatively to the other, means for imparting the movement of the one box toward and from the other, both boxes having at relatively opposite portions steam-passages through their walls, each said passage having an intermediate beveled annular seat, and its wall outwardly therebeyond internally screw-threaded, a pipe having its intermediate portion ranging along the back of said boxes, having its end portions deflected from said intermediate portion, and having at each extremity an enlargement with a beveled end, an annular packing on said seat, and an annular nut rotatable on each pipe extremity back of and in engagement with, the said enlargement and having a screw engagement in the threaded portion of said passage, substantially as and for the purposes set forth.

6. In a vulcanizing apparatus a lower steam-box which is normally stationary, the same being, however, vertically adjustable and means for vertically adjusting it, another steam-box mounted for movement toward and away from the lower box, mechanism for imparting its lowering and rising movements thereto, and a metallic pipe having steam connection with an upper portion of the lower box at one end portion thereof and having a steam connection with the upper steam-box at the opposite end portion thereof, said pipe ranging with an upward inclination along the back of said boxes and having the end portions thereof turned or deflected from the intermediate longitudinally-ranging portion.

7. In a vulcanizing apparatus, in combination, a base-casing having lugs extending inwardly from opposite walls thereof and adjusting supporting-screws threading and protruding above said lugs, a lower steam-box which is normally stationary, being, however, vertically adjustably supported on said screws, another steam-box mounted for movement toward and away from the lower box, mechanism for imparting its approaching and separating movements thereto, and a metallic pipe having steam connection with an upper portion of the lower box at one end portion thereof and having a steam connection with the upper steam-box at the opposite end portion thereof, said pipe ranging with an upward inclination along the back of said boxes and having the end portions thereof turned or deflected from the intermediate longitudinally-ranging portion.

8. In a vulcanizing apparatus of the character described, upper and lower steam-boxes, and means for providing steam in both, a base-casing which has at its bottom an area greater than the area of the lower box and which rise from such bottom with an inward inclination, and has at its top an opening, the boundaries of which are slightly greater than those of the walls of such box which is supported within said casing with its bottom above the bottom of the casing, whereby a surrounding space is established between the top of the casing and the lower box, and means for imparting a movement of one of said boxes toward and from the other.

9. In a vulcanizing apparatus, upper and lower steam-boxes, and means for providing steam in both, a base-casing having at its bottom an area greater than the area of the lower box and rising from such bottom with inwardly-curving walls, and having at its top an opening the boundaries of which are slightly greater than those of the walls of such box which is supported within said casing with its bottom above the bottom of the casing, means for imparting a movement of one of said boxes toward and from the other, and a heater located within said casing under the lower box.

10. In a vulcanizing apparatus, in combination, the lower box having its bottom corrugated from end to end, and having a flat top, the upper steam-box having a flat bottom and means for imparting thereto its movements toward and away from the lower box, a pipe connecting the lower and upper boxes, a casing surrounding the lower portion of the lower box, the bottom of which box is above the bottom of the casing, and said casing having its upper portion inwardly extending toward the wall of the box and constructed with an opening at its top slightly larger than the area of the box whereby there are established upwardly-leading air-passages adjacent the sides of the box, and a heater within the casing centrally below the lower box.

11. In a vulcanizing apparatus, in combination, the lower box having its bottom corrugated, thereby producing increased external heating-surface and also internal water-legs, a casing surrounding the lower portion of the lower box, the bottom of which box is above the bottom of the casing, and said casing being constructed with upwardly-leading air-passages adjacent the sides of the box, the upper box, means for imparting thereto its movements toward and away from the lower box, a pipe leading from an upper portion of the lower box to communication with the interior of the other box, and a heater within the casing beneath the lower box.

12. In a vulcanizing apparatus, a lower steam-box, a suitable support therefor, and a heater thereunder, a pipe having connection with the lower portion of such box, a filling branch, and a draw-off branch therewith connected, and a cock for each branch, the upper box movable toward and from the lower one, having means for imparting its movements thereto and a steam-conduit extending from an upper portion of the lower box into the upper box.

13. In a vulcanizing apparatus, a lower steam-box, a support therefor, and a heater under such box, a pipe having connection with the lower portion of said box, an upstanding filling branch having a receptacle at its top, the top of said receptacle being below the top of the chamber in said box, a cock for closing communication between said branch and the interior of the lower box, the pipe-connected upper box, and means for imparting its movements toward and from the lower box.

14. In a vulcanizing apparatus, a lower steam-box, a support therefor, and a heater thereunder, a pipe having connection with the lower portion of said box, and having connected therewith an upstanding filling branch provided with a receptacle at its top, the top of which receptacle is below the top of the chamber in the box, said pipe being also provided with a discharging branch which branch and the filling branch have shut-off cocks, said pipe having a further upstanding branch provided with a pressure-gage and having also coupled therein a safety-plug substantially as described, the upper-box pipe connected with the lower box, means for imparting its movements toward and away from the lower box, substantially as described.

15. In a vulcanizing apparatus, in combination, the lower steam-box, the base-casing having within the opposite walls thereof the inwardly-projecting pair of lugs $a$ $a$ and the central lugs $r^3$, said box being supported by said pairs of lugs $a$ $a$, the upper box having the depending bars $q$ guided through lugs provided at the opposite walls of the lower box, the lever members $r$ $r$ united at their upper outer ends and pivotally connected to said lugs $r^3$, and having links which are connected thereto near said pivotal connections and which are also connected to the lower ends of the said depending bars $q$.

16. In a vulcanizing apparatus, in combination, the lower steam-box, the base-casing having within the opposite walls thereof the inwardly-projecting pairs of lugs $a$ $a$ having the screws threading through and protruding above the tops thereof, constituting adjustable supports on which the lower box rests, and said casing having the central lugs $r^3$, the upper box having the depending bars $q$, the lever members $r$ $r$, united at their outer upper ends and pivotally connected at their lower inner ends upon said lugs $r^3$ and having links which are connected thereto near their pivotal connections, and which links are also connected to the lower ends of said depending bars $q$, substantially as described.

Signed by me at Springfield, Massachusetts, in presence of two subscribing witnesses.

RICHARD HALE SMITH.

Witnesses:
M. A. BERRY,
E. G. GARRETTSON.